June 30, 1959 R. L. HUSTEAD 2,892,635
SPRINGLESS BOX TRAILER CHASSIS
Filed Oct. 1, 1956

INVENTOR.
RALPH L. HUSTEAD
BY
Brown, Critchlow, Flick & Peckham
HIS ATTORNEYS

United States Patent Office 2,892,635
Patented June 30, 1959

2,892,635

SPRINGLESS BOX TRAILER CHASSIS

Ralph L. Hustead, Uniontown, Pa.

Application October 1, 1956, Serial No. 612,991

7 Claims. (Cl. 280—106)

This invention relates to an improved wheeled vehicle for hauling and aims to provide a bed and frame construction of economical design.

A particular object of the invention is to provide a unique frame construction formed from pipe bent so as to provide adequate support from the axle to the bed.

Another object of the invention is to provide an improved bed construction of simple yet rugged construction which is resistant to weathering, and which will not develop cracks or holes.

The objects are accomplished by a construction which can be shipped in knocked-down condition, and can readily be assembled by the purchaser, or can easily be dismantled by him for storage. These features make the vehicle highly useful for suburbanites, farmers, or others who need a simple and economical hauling vehicle. At the same time the vehicle has strength comparable to a factory-assembled vehicle.

The vehicle construction may be adapted for use as a two-wheeled trailer or push cart or as a four-wheeled vehicle.

These, and other objects and advantages of the invention will become apparent as the description proceeds.

This application is in part a continuation of my application Serial No. 525,468 filed August 1, 1955, and now abandoned.

Figure 1:
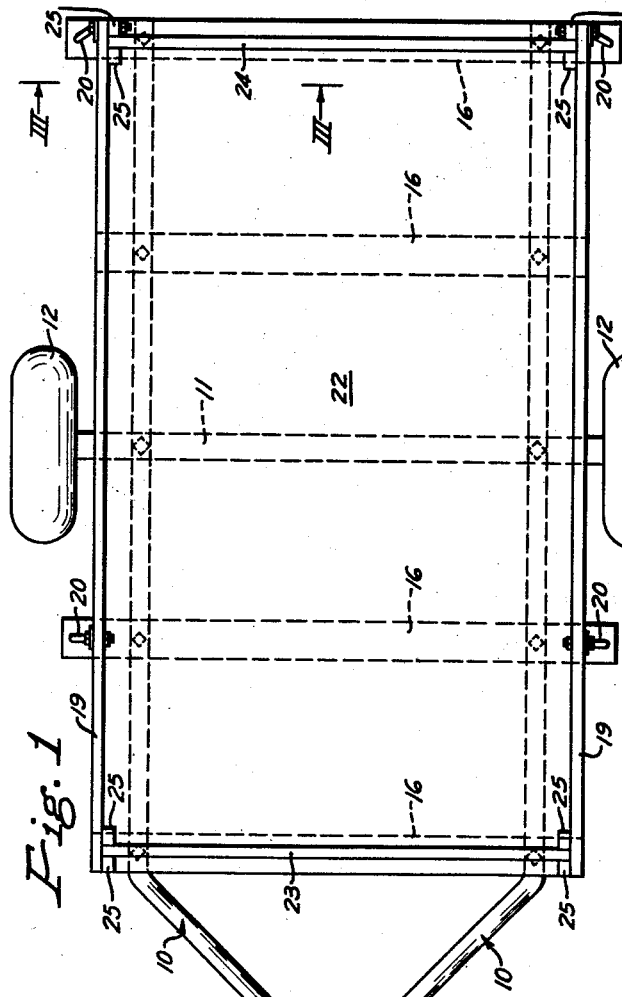
Fig. 1 is a plan view of a vehicle embodying the invention.
Figure 2:
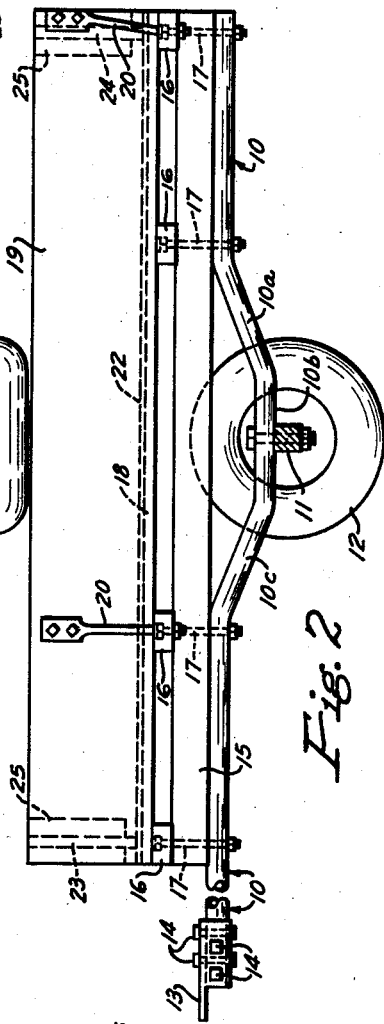
Fig. 2 is a side elevation of the vehicle shown in Fig. 1.
Figures 3, 4:
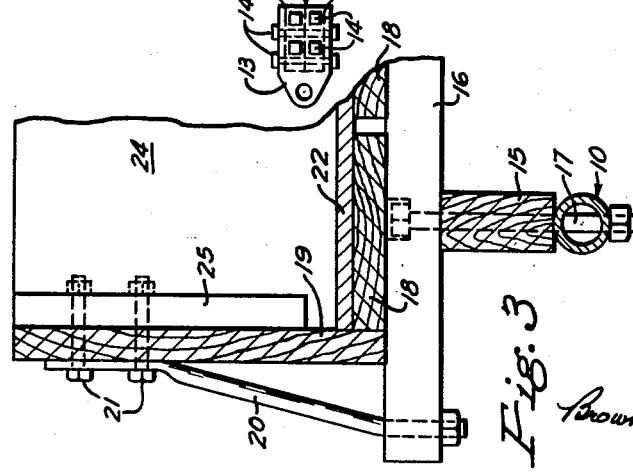
Fig. 3 is a partial vertical section on line III—III of Fig. 1 illustrating the frame and bed construction.
Fig. 4 is a diagrammatic view illustrating the invention applied to a four-wheeled vehicle.

In the drawings, Figs. 1 to 3 illustrate a two-wheeled trailer of the type adapted to be towed by an automobile, and this example of the construction will now be described in detail.

The frame is formed of two pieces 10 of pipe of suitable material, one of which extends along each side of the vehicle. These two tubular frame members 10 form the sole support for the vehicle bed, and are bent downwardly intermediate their ends in order to form strut members which engage the vehicle axle 11.

The axle 11 carrying wheels 12 may be of any preferred construction, and may be supplied by the user of the vehicle. Since the axle and wheels are of usual construction they will not be described in detail.

Each of the tubular frame members 10 has one end even with the rear end of the vehicle bed. The member 10 extends forwardly under the bed for a short distance and is then bent downwardly at an angle to form the strut 10a; continues straight forward to form the axle support 10b; is then bent upwardly to form the strut 10c; and then continues straight forward to the front end of the vehicle bed. The forward ends of the two frame members 10 are bent inwardly toward each other until they contact a hitch plate which is secured to the members 10 in a suitable manner, as by bolts 14.

A sill member 15, which is preferably of wood, 2" x 4" in cross section, is stood on edge on top of each of the frame members, and a plurality of cross members 16 extend transversely of the bed with their ends resting on top of the sill members 15. The cross members 16 are preferably of wood, 2" x 4" in cross section and laid flat. In the trailer illustrated four of these cross members 16 are used. Each of the cross members 16 is held in place by a bolt 17 which extends through the cross member 16, the sill 15, and the tubular frame member 10. The heads of the bolts 17 are countersunk in the cross members 16 so that flooring members may be laid flush with the top of the cross members 16.

On top of the cross member 16, and extending longitudinally of the vehicle are the subfloor boards 18. These subfloor boards may be of a size to suit the particular use for which the vehicle is to be used. For heavy loads, these subfloor boards 18 should be of thick material, but for lighter loads they may be thinner. In the form illustrated for moderate loads they are of wood, 1" x 6" in cross section, and they may be spaced apart according to the load requirements.

The sideboards 19 are of wood, 1" x 12" in cross section, and stand on edge directly on the cross members 16. The sideboards are braced and held in place by braces 20, which have their lower ends anchored in extensions of the cross members 16 and their upper ends secured to the sideboards by bolts 21.

The floor 22 is preferably formed from a single piece of hard, weather-proof material such as Masonite. This one-piece floor construction is free of joints that might open up to form cracks, through which grain or other small material might fall. The floor may be secured to the subfloor boards in any preferred manner, as by nails or screws.

The front gate 23 and the rear gate 24 are held in place by vertical guides 25 which are suitably fastened to the sideboards 19. The front and rear gates are slidable in the guides 25 so that they may be readily removed when material of extra length is to be hauled.

The vertical guides 25 do not come all the way down to meet the floor 22. This space is provided so that subfloor boards 18 and floor 22 may be formed of thicker material if the vehicle is to be used for very heavy loads. This construction permits building the vehicle to carry heavy or light loads while using standardized parts for the remainder of the vehicle.

It will be clear from the above description that the vehicle construction of the present invention is simple and economical and has a number of advantages. The frame members 10 may be easily formed by bending up ordinary pipe of a size suitable for the particular vehicle. The remaining parts are all pieces of lumber or other material of usual sizes.

Since the parts are merely bolted together, they may be shipped knocked-down but prepared for quick and easy assembly by the user. This construction also permits the user to disassemble the parts for storage in a small space.

The frame members 10 are simple and economical to make, yet provide adequate support for the load. By reason of the downwardly extending V formed by the struts 10a and 10c, the support from the axle is carried to the sill member 15 at points spaced fore and aft of the axle. It will be noticed that in the form illustrated the strut 10a supports the sill member 15 at a point approximately midway between the center of the vehicle and its rear end while the strut 10c supports the sill at a point approximately midway between the center of the vehicle and the front end. By this construction, if the load is evenly distributed over the floor of the vehicle, the front half of the load and the rear half of the load will have equal support direct to the axle, without any excessive concentration of strain at the middle portion of the sills. The upper ends of the struts 10a and 10c are rigidly tied together by the sill member 15, so that these parts form a rigid triangle which is strong, yet light in weight.

The straight axle support 10b provides a convenient means for mounting any preferred type of axle. The axle may be furnished by the user, from a junked car or truck.

In hauling many types of loads it is not necessary to provide spring support, and in this construction it is preferred to bolt the axle 11 directly to the support 10b, thus avoiding the complex structure and expense of springs. Road shock is sufficiently absorbed by the pneumatic tires 12.

While the invention has been described as applied to a two-wheeled trailer, it will be clear that it can equally be applied to a two-wheeled push cart, or to a four-wheeled vehicle, as illustrated diagrammatically in Fig. 4. In this case each frame 10 is formed with two V-shaped projections, one for engaging each axle. The forward axle may be formed with any suitable type of fifth wheel.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A vehicle frame comprising: a continuous tubular frame member extending longitudinally along each side of the frame, a continuous one-piece sill member of rectangular cross section mounted on top of and parallel to each of the tubular frame members, each tubular frame member being bent downwardly from the sill member to form at least one open truss, the truss being free of any compression struts, and being connected at its lower end to a vehicle axle, the tubular frame member being bolted to the sill member at connection points located at each end of the open truss, and the tubular frame member being bolted to the sill member at second connection points spaced from the first-named connection points, the tubular frame member being free of any connection with the sill member except for the said spaced-apart bolted connections, thereby forming compound beam members at each end of the open truss.

2. A device as specified in claim 1 in which the tubular frame members are formed of steel and the sill members are formed of wood.

3. A device as specified in claim 2 in which a cross member extends across the body at each connection point and is anchored to the sill member by the same bolts which connect the tubular frame member to the sill member.

4. A vehicle of the type having a frame carrying a bed and comprising: a pair of continuous tubular frame members, each frame member starting at the rear end of the vehicle frame, extending forwardly to the front end of the frame and then extending inwardly to meet the front end of the other frame member, a hitch plate secured to the front ends of the tubular frame members, a continuous one-piece sill member of rectangular cross section mounted on top of and parallel to each of the tubular frame members, each tubular frame member being bent downwardly at its intermediate portion to form an open truss, the truss being free of any compression struts, and being connected at its lower end to a vehicle axle, each tubular frame member being bolted to the sill member at terminal connection points located at the rear and front ends of the vehicle bed, each tubular frame member being bolted to the sill member at intermediate connection points which are adjacent the ends of the frame truss, each intermediate anchorage point being located approximately midway between the axle and one of the terminal connection points, the portions of the frame members and sill members between the terminal and intermediate connection points being free of any interconnection and forming compound beams, the weight of the load being transmitted from the sill members to the axle solely by the open trusses of the frame members.

5. A vehicle as specified in claim 4 in which the tubular frame members are formed of metal and the sill members are formed of wood.

6. A vehicle as specified in claim 5 in which a cross member extends across the body at each connection point and is anchored to the sill member by the same bolts which connect the tubular frame member to the sill member.

7. A vehicle frame comprising: a continuous tubular frame member extending longitudinally along each side of the frame, a continuous one-piece sill member of rectangular cross section mounted on top of and parallel to each of the tubular frame members, each tubular frame member being bent downwardly from the sill member to form at least one open truss, the truss being free of any compression struts, and being connected at its lower end to a vehicle axle, the tubular frame member being bolted to the sill member at connection points located at each end of the open truss, and the tubular frame member being bolted to the sill member at second connection points spaced from the first-named connection points, thereby forming compound beam members at each end of the open truss.

References Cited in the file of this patent

UNITED STATES PATENTS

| | | |
|---|---|---|
| 67,628 | Bratton | Aug. 13, 1867 |
| 1,264,651 | Hubbard | Apr. 30, 1918 |
| 1,486,728 | Chesson | Mar. 11, 1924 |
| 2,188,578 | Robinson | Jan. 30, 1940 |
| 2,669,480 | Messick et al. | Feb. 16, 1954 |
| 2,693,387 | Walsh | Nov. 2, 1954 |

FOREIGN PATENTS

| | | |
|---|---|---|
| 496,403 | Great Britain | Nov. 30, 1938 |